(12) United States Patent
Nespeca

(10) Patent No.: US 8,699,177 B2
(45) Date of Patent: Apr. 15, 2014

(54) SYSTEM FOR AND METHOD OF PROPERLY POSITIONING A MAGAZINE MEDIA ADAPTED FOR LIBRARY STORAGE

(75) Inventor: Nicholas Aldo Nespeca, Boulder, CO (US)

(73) Assignee: Spectra Logic Corporation, Boulder, CO (US)

( * ) Notice: Subject to any disclaimer, the term of this patent is extended or adjusted under 35 U.S.C. 154(b) by 255 days.

(21) Appl. No.: 13/208,179

(22) Filed: Aug. 11, 2011

(65) Prior Publication Data

US 2013/0038963 A1     Feb. 14, 2013

(51) Int. Cl.
*G11B 15/68* (2006.01)

(52) U.S. Cl.
USPC .......................................... 360/92.1; 360/94

(58) Field of Classification Search
USPC ................................... 360/92.1, 94
See application file for complete search history.

(56) References Cited

U.S. PATENT DOCUMENTS

| | | | |
|---|---|---|---|
| 2,692,813 A * | 10/1954 | Toronto | 312/408 |
| 4,932,826 A | 6/1990 | Moy et al. | |
| 5,034,935 A * | 7/1991 | Ishibashi et al. | 369/30.59 |
| 5,345,349 A * | 9/1994 | Pierrat | 360/92.1 |
| 5,479,581 A * | 12/1995 | Kleinschnitz | 700/247 |
| 5,700,125 A | 12/1997 | Falace et al. | |
| 5,836,735 A | 11/1998 | Yeakley et al. | |
| 6,011,669 A | 1/2000 | Apple et al. | |
| 6,059,509 A | 5/2000 | Ostwald | |
| 6,068,436 A | 5/2000 | Black et al. | |
| 6,550,391 B1 * | 4/2003 | Ostwald et al. | 104/88.02 |
| 6,574,173 B1 | 6/2003 | Manes | |
| 7,433,150 B2 * | 10/2008 | Hoelsaeter | 360/92.1 |
| 7,782,565 B2 * | 8/2010 | Starr | 360/92.1 |
| 2002/0101685 A1 | 8/2002 | Taki et al. | |
| 2003/0113193 A1 * | 6/2003 | Ostwald et al. | 414/281 |
| 2007/0236826 A1 * | 10/2007 | Starr | 360/90 |

* cited by examiner

*Primary Examiner* — Wayne Young
*Assistant Examiner* — Carlos E Garcia
(74) *Attorney, Agent, or Firm* — Kenneth Altshuler

(57) ABSTRACT

A system for and method of properly positioning a media magazine in a mass data storage library.

21 Claims, 10 Drawing Sheets

SYSTEM FOR AND METHOD OF PROPERLY POSITIONING A MAGAZINE MEDIA ADAPTED FOR LIBRARY STORAGE

FIELD OF THE INVENTION

The present invention relates to mass data storage libraries, and more particularly to a system for and method of properly positioning a media magazine in such a library.

BACKGROUND OF THE INVENTION

Mass data storage libraries contain and store many media such as optical disks, magnetic disks, or tape cartridges containing huge amounts of information or data embedded thereon. The media typically bear identifying indicia such as barcodes on a surface of the media so that information embedded in the media may be associated with the indicia and so that the location of and an inventory of the information in the media within the library may be maintained in a computer-based memory for inventory management. The libraries typically employ robots that are designed to move within the library and to transport the media between their storage locations and a drive that is designed to read information from or write information onto the media. A host computer having an associated operator input, such as a keyboard or a touch screen, is used to issue commands to the robot and to the drive so as to coordinate and implement the library functions of storing the media in selected locations and reading information from and writing information onto the media via the drives.

The host computer may communicate with the memory, the robot, and the drive to facilitate library operations. So, for example, the library operator may wish to read certain information embedded in one of the media. The computer-based memory will know in what media that information is embedded and will know where in the library the media containing that information is located for storage. The host computer may then instruct the robot to move to a location where the desired media is stored, grab the media, move the media to the drive, and then insert the media into the drive. The host computer may then display the information read by the drive that is embedded in the media disposed within the drive. A reverse process may be used to return the media back to a particular storage location in the library.

In relatively large mass data storage libraries, the media can be contained in removable, transportable magazines. The magazines are somewhat like trays in which the media typically stand upright and usually such that the identifying indicia associated with each media is presented on an upper or outer, exposed surface. Often a magazine contains media embedded with associated, related information.

In these larger library systems, a robot may transport the entire magazine containing the media to a particular storage location, although when implementing read or write operations, the robot will still select a single media from the magazine before transporting the media to and inserting the media into the drive. As such, the magazines themselves also typically bear identifying indicia, such as a barcode on an outer, exposed surface.

When magazines containing media need to be placed into the library or taken from the library, modern libraries utilize a so-called input/output or import/export station through which the desired magazines may be placed into or removed from the library. These I/O stations are used so that there is no need to perform a complete re-inventory of the media stored in the library and so that library operations via the robot and the drive may continue without interruption. When an operator places a magazine into the I/O station, it is important that the magazine is properly positioned so that the identifying indicia can be properly scanned into the library memory for inventory management, and so that the robot may properly grasp the magazine and transport the magazine to its designated storage location. If a magazine is improperly positioned in the I/O station, then the process may be halted, resulting in down time of library operations, or more severely, might result in damage to the magazine or the media contained therein or result in malfunctioning of or damage to the robot.

The present invention was developed in the context of this background.

SUMMARY OF THE INVENTION

The present invention relates to a system for and method of properly positioning an element magazine in a mass data storage library.

BRIEF DESCRIPTION OF THE DRAWINGS

The present invention will be described with reference to the accompanying drawings, wherein.

DESCRIPTION OF A PREFERRED EMBODIMENT

Figure 1:
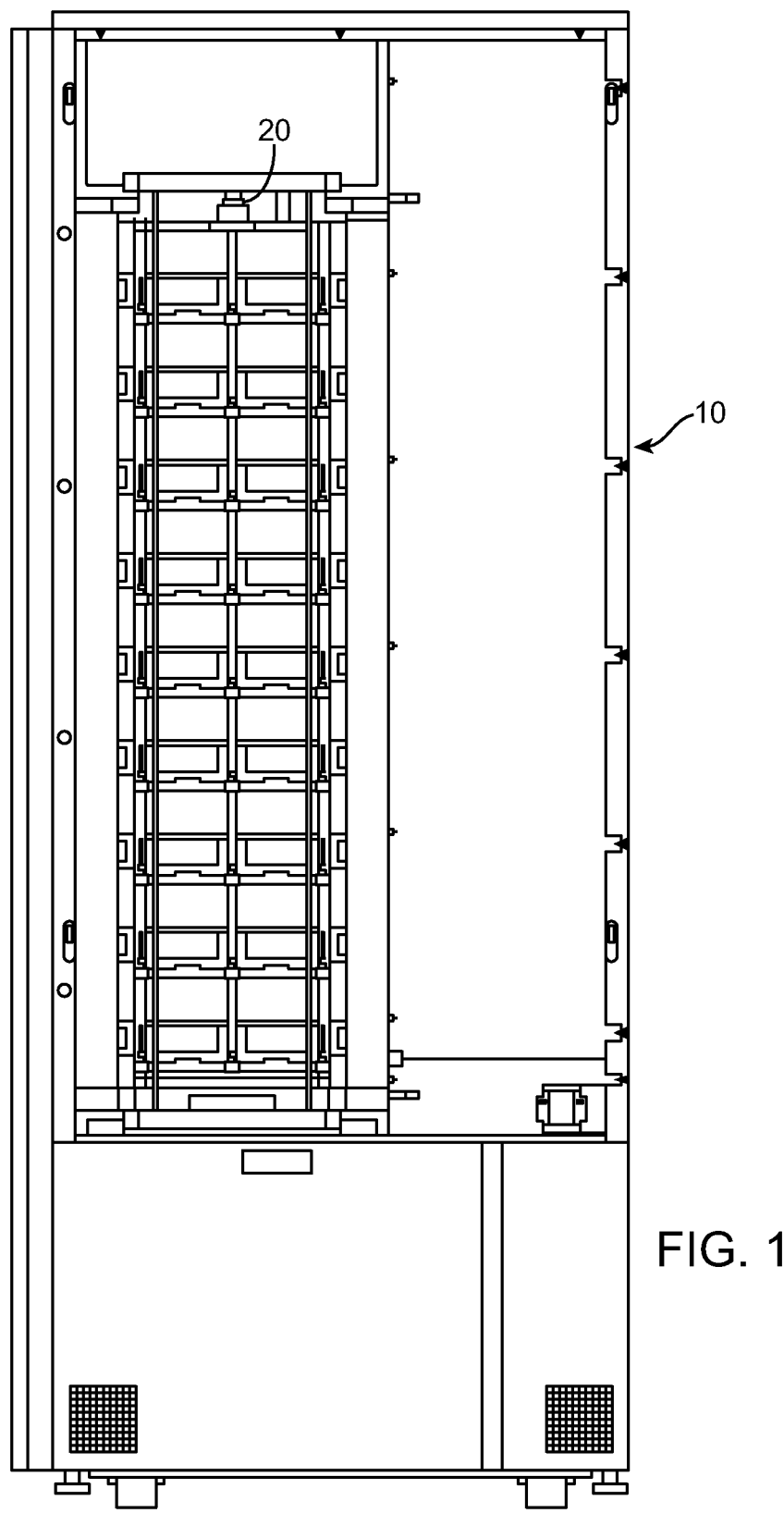
FIG. 1 is a plan schematic illustration of a portion of a mass data storage library in which the present invention may be utilized.

The present invention will be described with reference accompanying drawings, wherein like reference numerals refer to the same item.

Figure 2:
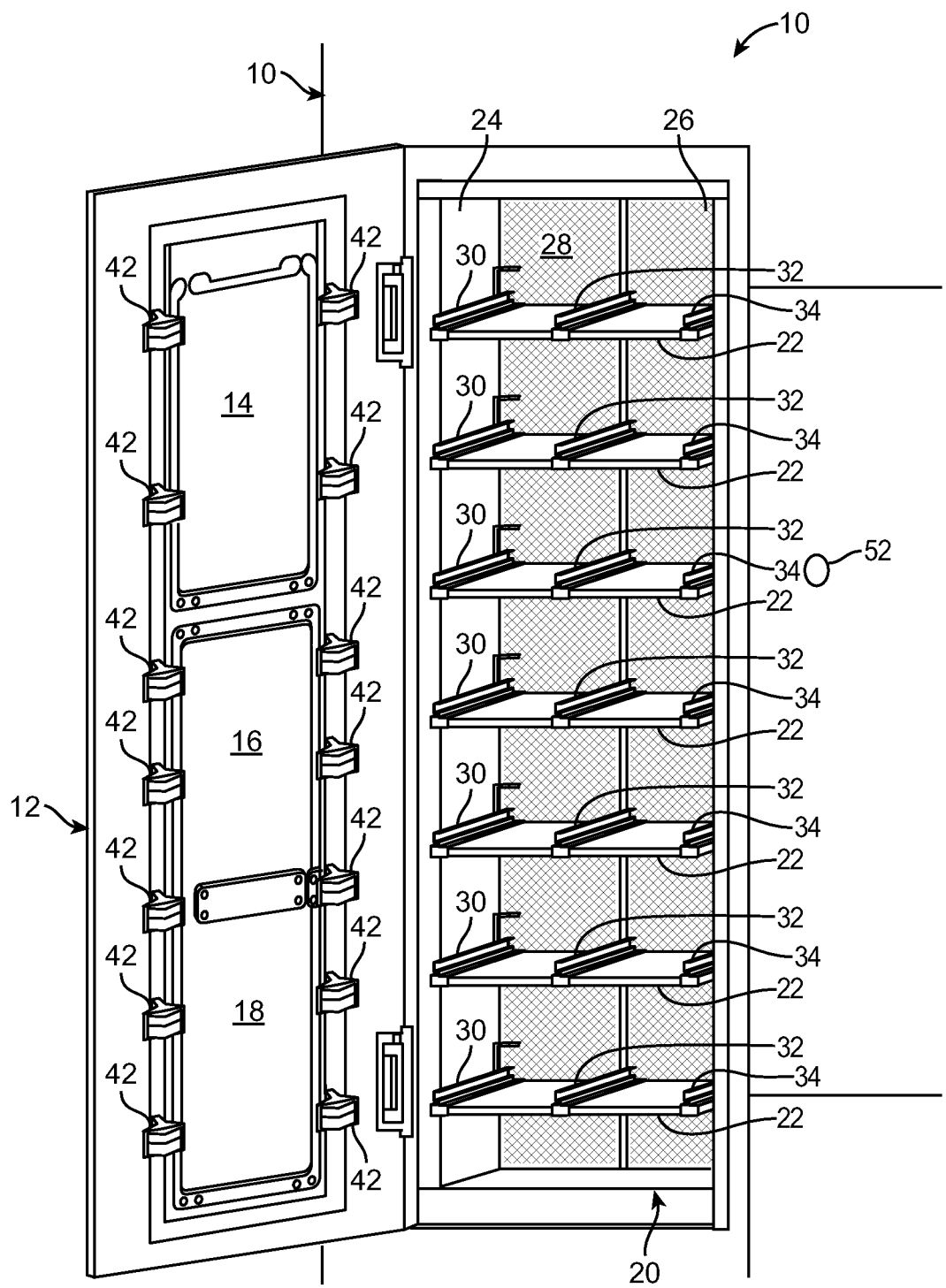
FIG. 2 is a perspective view of a mass data storage library such as that shown in FIG. 1 and depicts the library housing with an opened, hinged door to reveal a magazine rack having a series of vertically spaced shelves for receiving media magazines.

FIGS. 1 and 2 show a portion of a mass data storage library of a type that may utilize the present invention. The library possesses a cabinet or housing 10 that generally surrounds and contains other components (not shown) of the library, such as at least one robot, at least one media drive, and various media storage locations, such as slots or stacks for containing and storing media or magazines containing such media. The mass data storage library may for example be the TFinity library manufactured and distributed by Spectra Logic Corporation of Boulder, Colo.

As shown in FIGS. 1 and 2, the mass data storage library includes an input/output station generally including an openable and closable hinged door 12 having three transparent glass or plastic panels of 14, 16, 18 and including a vertically upstanding, rotatable spindle or carousel 20 carrying a plurality of vertically spaced shelves 22. A side wall 24, 26 extends vertically along each lateral edge of each of the shelves 22. A rear wall 28 also extends along the rear edge of each of the shelves 22, and possesses a plurality of apertures that form a screen or grid pattern that helps promote ventilation within the library. The perforated nature of the rear wall also helps minimize any EMI levels when carousel 20 is rotated to a position where the rear wall 28 is adjacent to and facing the door 12 and also permits an operator to look through the door 12 and through the rear wall 28 in order to read any identifying indicia, such as a barcode, on the rear-facing outer surface of a magazine 36 disposed on a shelf 22.

Figure 3:
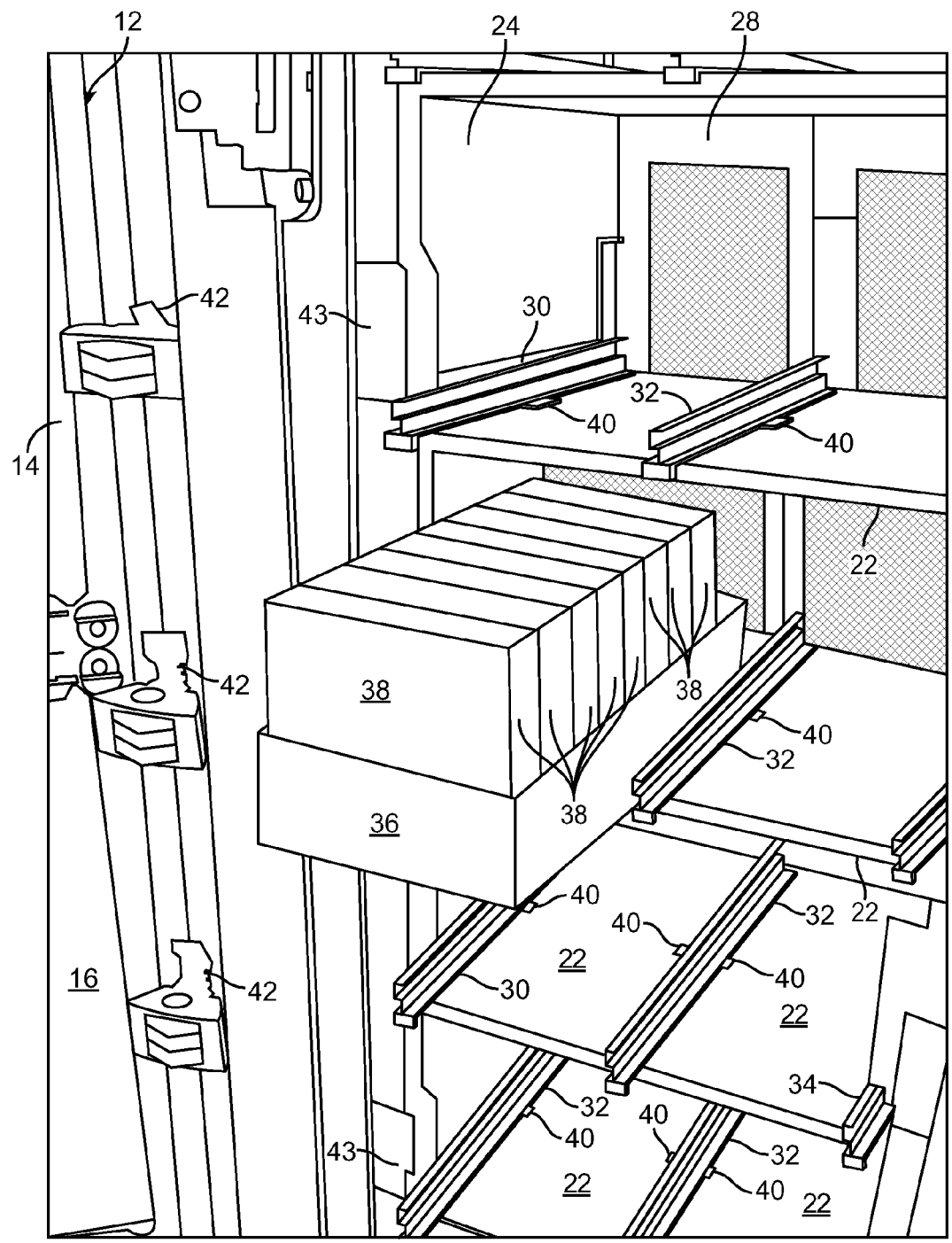
FIG. 3 is a perspective view of the data storage library shown in FIG. 2 with a media magazine partially slideably inserted into a shelf in the magazine rack.
Figure 4:
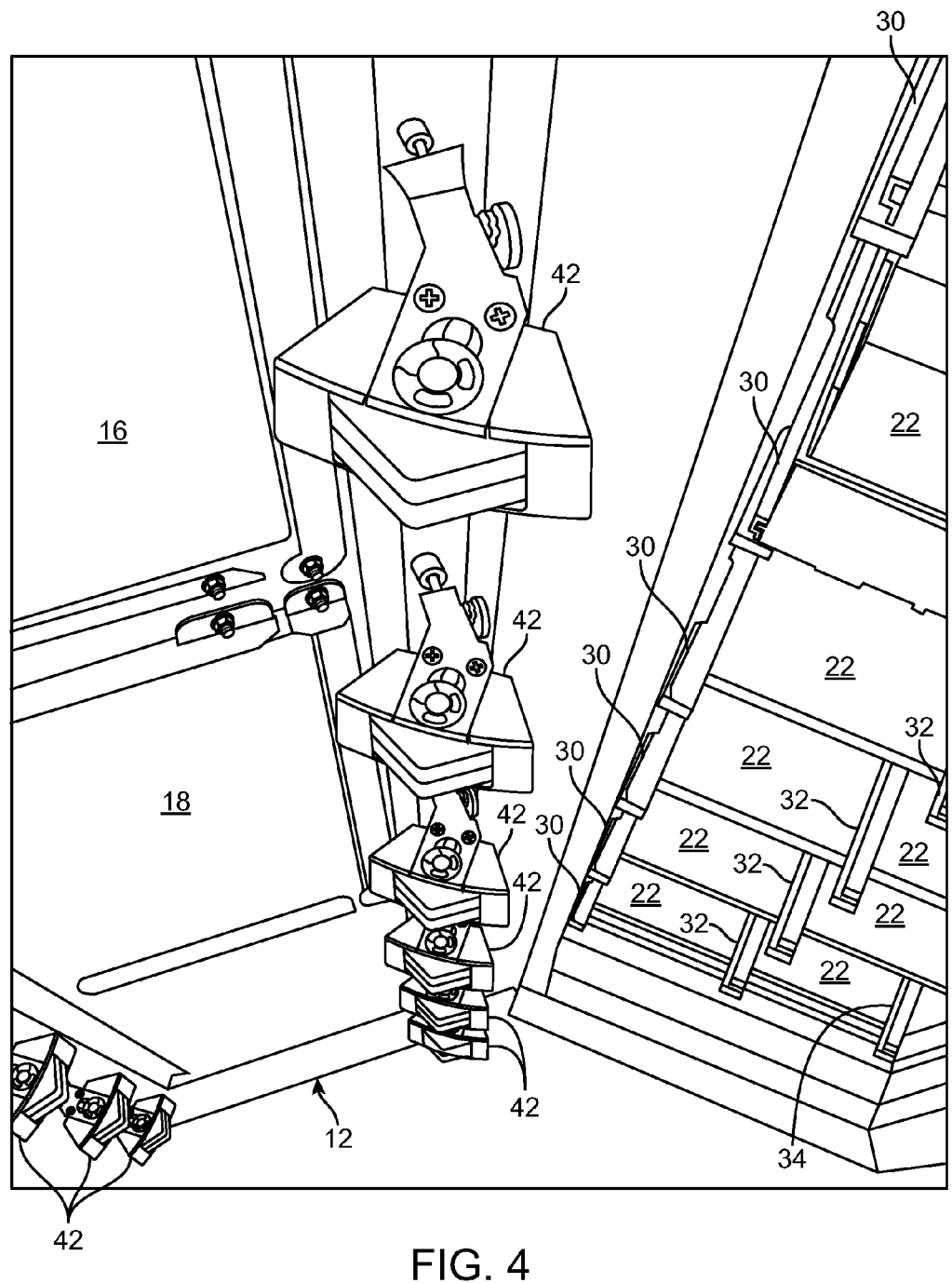
FIG. 4 is a perspective view of the mass data storage library housing door and magazine rack shown in FIG. 3 and shows in detail several of the biasing elements that are adapted to properly position a media magazine on a shelf in the magazine rack in a preferred embodiment of the present invention.
Figure 5:
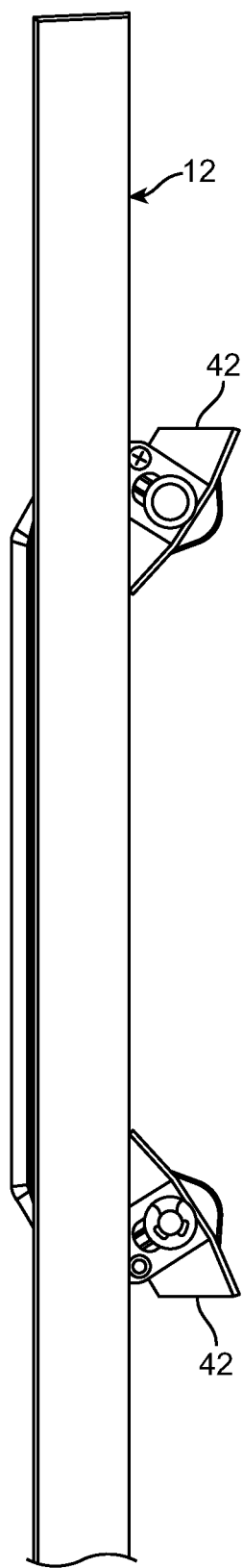
FIG. 5 is a schematic illustration of a top view of a pair of the biasing elements mounted on a door as generally shown in FIG. 4.

Each magazine 36 is adapted to contain a plurality of media, such as tape cartridges 38, in a vertically upstanding position so that the indicia, such as barcodes, that identify each different tape cartridge 38 are positioned on a vertically upstanding face of each tape cartridge 38, as best shown in FIG. 3. Each magazine 36 is also preferably provided with indicia associated with that particular magazine 36 on the outside front-facing surface as well as the rear-facing surface of the magazine 36, which indicia may also comprise a barcode (not shown).

As best shown in FIGS. 2 and 3, each shelf 22 includes three longitudinally extending rails, 30, 32, 34 mounted thereon. Each rail has at least one longitudinally extending recess or groove that is adapted to receive a corresponding longitudinally extending rib (not shown) on the exterior side surface of a media magazine 36, as best shown in FIG. 3. In a preferred embodiment, the ribs on the opposing exterior surfaces of the side walls of the magazine 36 are disposed at different vertical heights (and the corresponding grooves or recesses in the rails 30, 32, 34 are also disposed at different vertical heights) so that the magazine 36 may be longitudinally inserted along each shelf 22 in only one orientation such that the indicia on the outer front-facing surface of the magazine 36 is exposed outwardly, and not toward the rear wall 28. In that sense, the ribs of each magazine 36 are asymmetrical.

It is important that a magazine 36 that is slid onto a shelf 22 achieves a proper position along the shelf 22 so that as the carousel 20 is rotated, the magazine 36 will not interfere with the rotation and bump into other components and structures of the library, and so that when the magazine 36 is rotated so as to be exposed and accessible to a robot within the library, the robot will know precisely where the magazine 36 is disposed.

As an aid in achieving a proper, predetermined longitudinal position of the magazine 36 along the shelf 22, each shelf 22 is preferably provided with series of detent stops, each of which preferably comprises a substantially square tab 40 fixedly mounted such as by screws or with adhesive adjacent to each lateral side of each rail 30, 32, 34. Each detent tab 40 includes a laterally extending depression or notch on the top surface thereof that is adapted to receive a corresponding boss (not shown) preferably integrally formed on the bottom surface of each magazine 36. The interaction of the boss on the underside of the magazine 36 with the depressions or notches in the detent tabs 40 permits each magazine 36 to be longitudinally slid along the rails 30, 32, 34 until a point where the boss rides over the outside edge of the detent tabs 40, and then drops into the depression or notch in the detent tab 40. An operator who manually inserts a magazine 36 longitudinally along the rails 30, 32, 34 can feel when the boss rides up over the outer edge of the detent tabs 40 and then drops into the depression or notch of the detent tabs 40, thereby signaling to the operator that the magazine 36 has been properly longitudinally positioned relative to the shelf 22. The rear section of the detent tab 40 is preferably relatively thick and relatively high so that the magazine 36 may not be pushed farther longitudinally inward, and so that the farthest extent of insertion of the magazine 36 is when the boss on the underside of the magazine 36 drops into the depression or notch in the detent tab 40. It will also be appreciated that the detent stop will help maintain each magazine 36 in the desired longitudinal position even when the carousel 20 is rotated and centripetal effects tend to force the magazine 36 radially outward.

The foregoing structure of and interrelationship between the magazines 36, the rails 30, 32, 34, and the bosses (not shown) and the detent tabs 40 have been commercially available under the brand name TERAPACK offered by Spectra Logic Corporation of Boulder, Colo. Such cooperative structures are also described in U.S. Pat. No. 7,227,715 (see especially col. 9, 1. 31-57), the relevant portions of which are incorporated herein by reference.

In connection with the operation of the I/O station, at least one magazine 36 is inserted on a shelf 22, the door 12 is closed, and the carousel 20 is rotated by means of a motor (not shown) so that the magazines 36 on the shelves 22 become oriented so as to face toward the interior of the library where a robot may gain access to the magazines 36. Preferably, the carousel 20 rotates approximately 180 degrees from the position shown in FIGS. 1-3. It will be appreciated that when the carousel 20 is rotated, if a magazine 36 has not been properly inserted to a desired longitudinal position, such as the position where the boss on the underside of the magazine 36 rests in the depression or notch of an associated detent tab 40, the outer facing end of the improperly positioned magazine 36 may bump into another structure in the library, which may cause damage to the magazine, the media in the magazine 36, the structure that the magazine 36 bumps against, or the carousel 20 itself. Also, if the magazine 36 is not properly inserted along the shelf 22, then when the magazine 36 faces inwardly so as to be accessible to the robot, the robot will not know the precise location of the magazine 36 relative to the shelf 22, and the robot may have difficulty grasping the magazine 36 or may incur damage in trying to grasp the magazine 36.

In a preferred embodiment of the present invention, the door 12 is provided on its interior surface with two series of vertically spaced biasing elements 42 as best shown in FIG. 2. Each biasing element 42 in each of the vertical series of the biasing elements 42 is maintained at approximately the same vertical position as an associated biasing element 42 in the other series, with both associated biasing elements 42 being vertically positioned as so to be slightly above a corresponding shelf 22 carried by the carousel 20. The biasing elements 42 are arranged and designed such that preferably when the carousel 20 rotates and when the magazines 36 are properly positioned along the associated shelf 22, the biasing elements 42 do not contact or move any of the magazines 36. However, if a magazine 36 is not sufficiently longitudinally inserted along the shelf 22, then the biasing element 42 will contact the outer end of the magazine 36 and push the magazine 36 longitudinally inwardly until such point as the boss on the underside of the magazine 36 rides up and into the depression or notch in the associated detent tab 40.

In general operation, when the door 12 is closed, the carousel 20 may be rotated to the left as shown in FIG. 2 and any improperly inserted magazines 36 on the left side of the shelves 22 as shown in FIG. 2 contact an associated one of the biasing elements 42 on the right side of the door as shown in FIG. 2, thereby pushing the magazine 36 longitudinally inward to its proper position. Similarly, the carousel 20 may be rotated to the right as shown in FIG. 2, and any magazine 36 improperly positioned on the right side of a shelf 32 as shown in FIG. 2 will contact an associated one of the biasing elements 42 on the left hand side of the door 12 as shown in FIG. 2, thereby pushing the magazine 36 longitudinally inward to its proper position. The rotation of the carousel 20 may be in a reverse sequence. Preferably, the left and right rotation spans an angular extent of about seven to twenty-five degrees, and more preferably within a range of about ten to fifteen degrees. Upon completion of these rotations, the carousel 20 may be rotated a much greater angular distance so as to expose the magazines 36 for access by the robot.

In a preferred embodiment, the forward edge of each side wall 24, 26 is provided with a recess or indented periphery 43 in the region where each biasing element 42 is located, as best shown in FIG. 3, so that biasing elements 42 do not contact the side walls 24, 26, but instead contact the outer portion of any magazine 36 that is not sufficiently inserted along the shelf 22.

Figure 6:
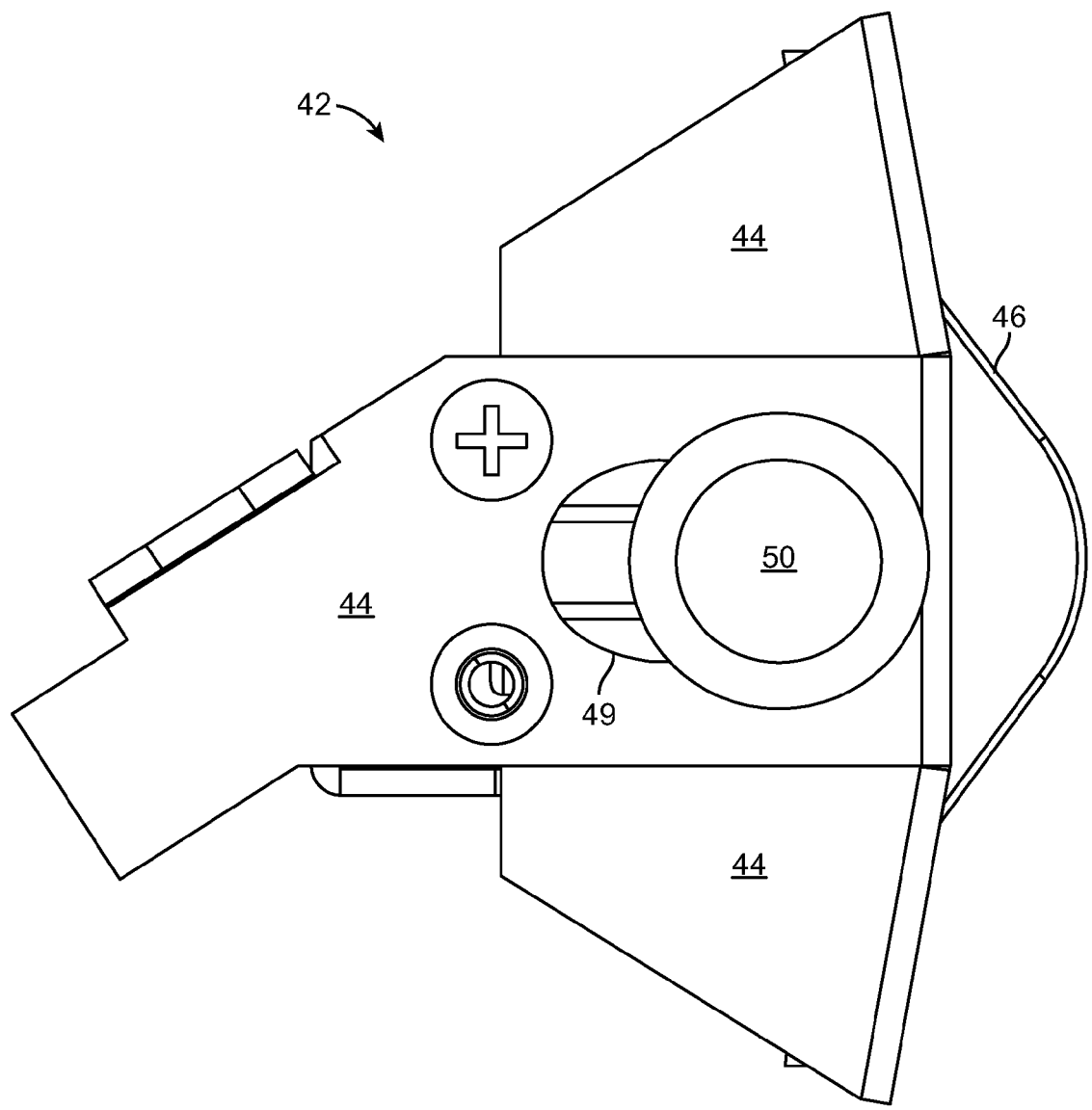
FIG. 6 is a top schematic illustration of one of the biasing elements shown in FIG. 5.
Figure 7:
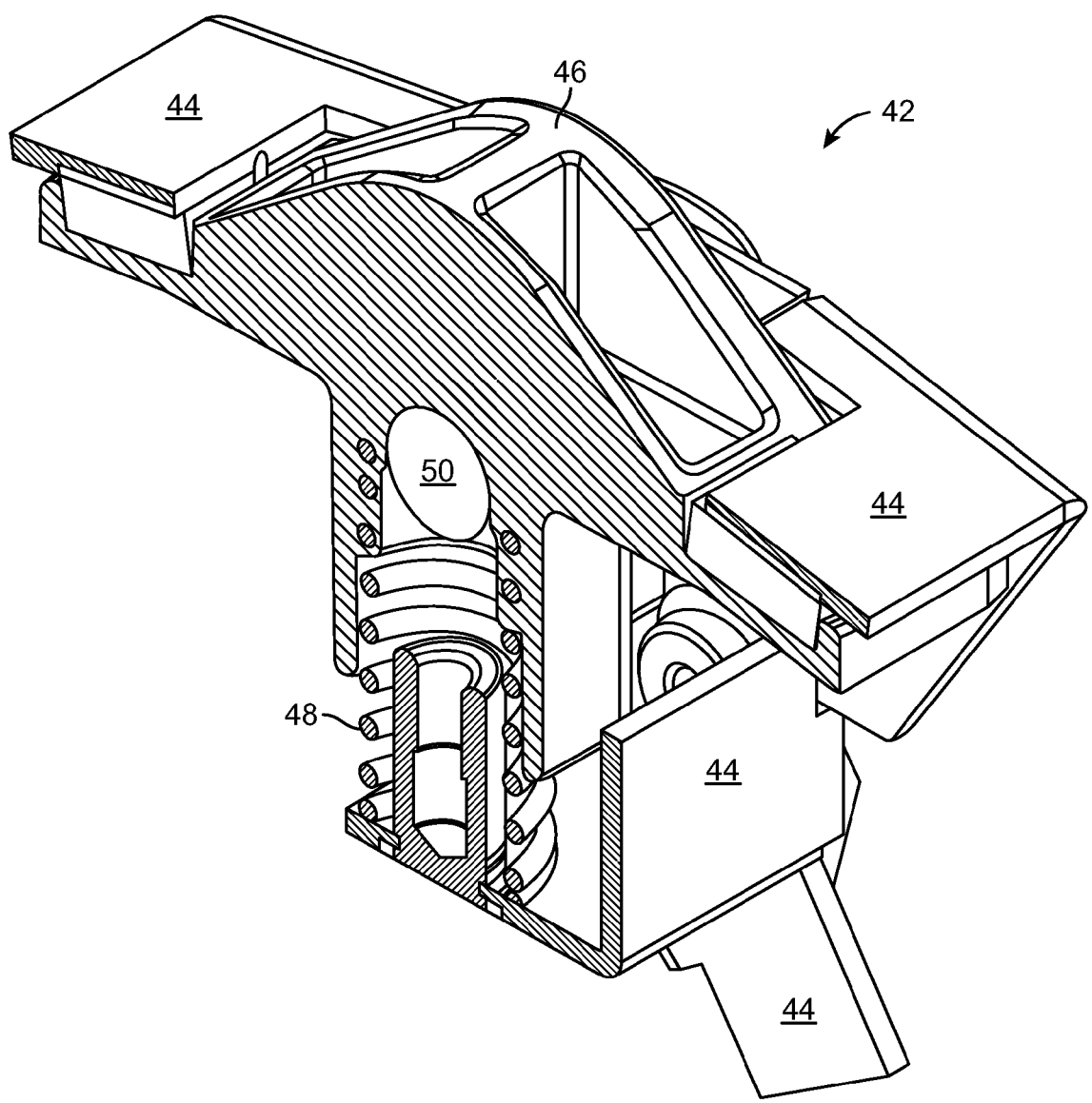
FIG. 7 is a perspective, partially cut-away illustration of the biasing element shown in FIG. 6.
Figure 8:
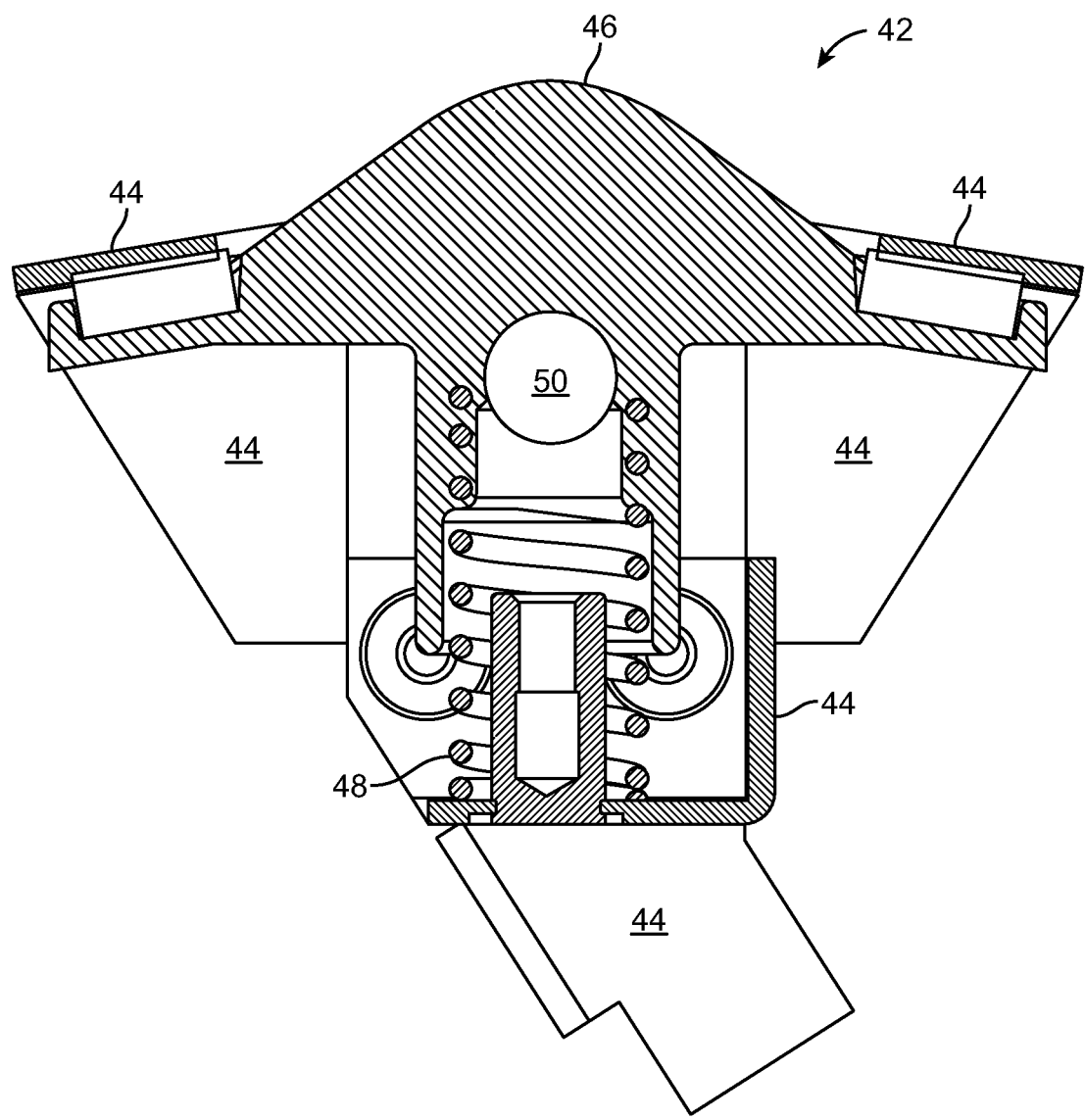
FIG. 8 is a plan, partially cut-away illustration of the biasing element shown in FIGS. 6 and 7.

The construction of a preferred biasing element 42 is best shown with reference to FIGS. 4-8. Each biasing element 42 includes a bracket 44 preferably formed of metal and preferably mounted to the interior surface of the door 12, with each bracket 44 preferably facing towards the axis of carousel rotation. Each bracket 44 preferably possesses an outer face having a substantially rectangular opening therein through which a convex cap or face of a knob 46, preferably formed of plastic, projects. The knob 46 floats a limited distance with respect to bracket 44, and is confined to a substantially longitudinal movement with respect to the bracket 44, as best shown in FIGS. 6-8. The knob 46 rides on a helical coil spring 48, which tends to bias the knob 46 in an outward longitudinal direction, in a position of farthest protuberance from the opening in the face of the bracket 44. One end of the spring 48 is preferably embedded in the back side of the knob 46. The bracket 44 also includes a longitudinal slot or track 49 in the wall thereof for receiving a pin 50 integrally formed with or otherwise secured to the knob 46. The disposition of the pin 50 slideably within the slot or track tends to restrict the movement of the knob 46 to a substantially longitudinally direction, in the same direction as the bias of the helical coil spring 48. Preferably, the width of the slot or track is slightly larger than the diameter of the pin 50 so that the pin 50 may freely ride along and within the slot or track, without binding (due to friction), which in turn, permits the knob 46 to freely move longitudinally backward, against the bias of the helical coil spring 48, within a limited longitudinal distance. Preferably the pin 50 may wobble within the slot or track through a small, limited angular range, preferably no more than about twenty degrees.

It should be appreciated that when an outwardly extending end of a magazine 36 insufficiently inserted along a shelf 22 is rotated with the carousel 20, the end of the magazine 36 will contact the convex face of the knob 46, which will cause the knob 46 to be depressed slightly longitudinally backward against the bias of the helical coil spring 48. The spring 48 will thus act through the knob 46 against the end of the magazine 36 in a manner that urges and pushes the magazine 36 longitudinally inward along the shelf 22 a sufficient distance to achieve the proper longitudinal position for the magazine 36 relative to the shelf 22. It will also be appreciated that the convex contour of the outer surface of the knob 46 helps to create a gradual, increasing pressure against the end of the magazine 36, and inhibits any abrupt contact between the knob 46 and the end of the magazine 36.

It will be further appreciated that biasing elements other than those just described may be advantageously implemented in connection with the present invention. For example, instead of a knob 46, the bracket 44 may carry a spring-biased, rotatable wheel fashioned of a solid material, such as a plastic or a rubber. Also, although in the preferred embodiment the knob 46 is fashioned of relatively hard plastic, the knob 46 may be fashioned of another material, such as an elastic material, which may be rubber.

Figure 9:
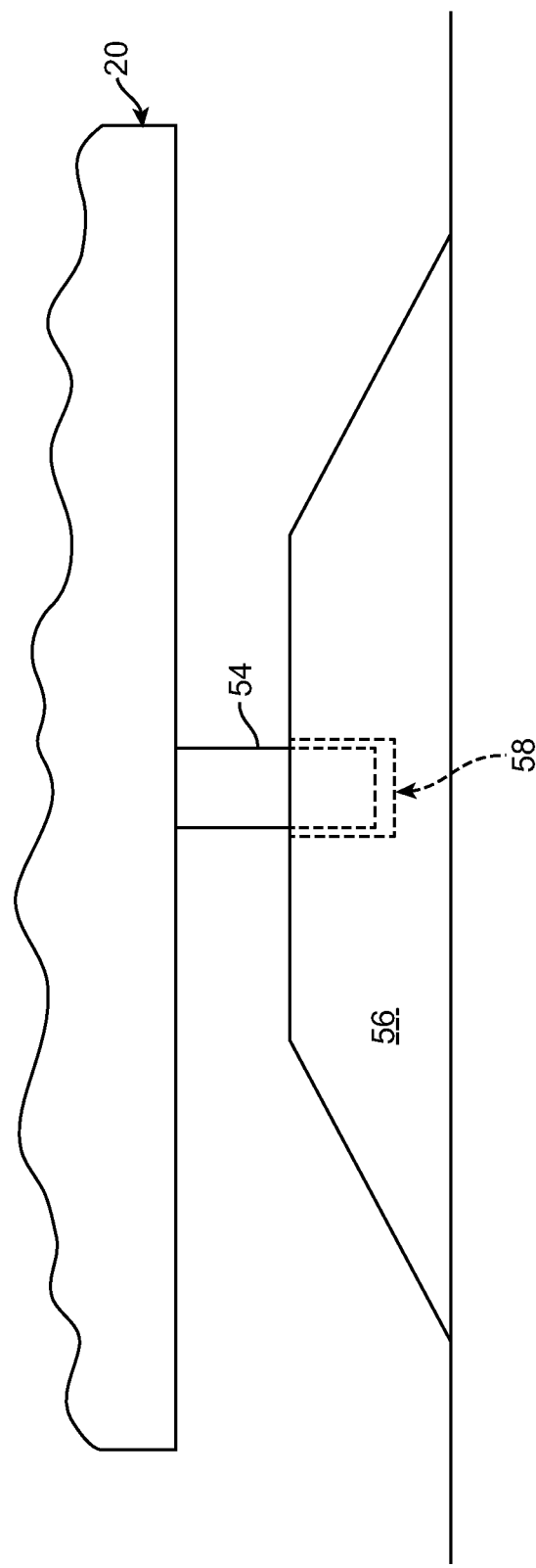
FIG. 9 is a schematic illustration of a stop mechanism that may be utilized with a carousel on which the magazine racks are carried in a preferred embodiment of the present invention.

The rotational position of the carousel 20 in the operation of the I/O station is important, especially when presenting the magazine 36 for access by a robot. A mechanism for helping to selectively maintain the carousel 20 in a preselected rotational position is shown in FIG. 9. The top of the carousel 20 may be provided with a spring-loaded solenoid (not shown) having a depending armature or rod 54. In an unenergized state, the rod 54 depends under spring bias in an extended position. As the carousel 20 rotates, the lower end of the rod 54 abuts an inclined or beveled surface of a ramp 56, and with continued rotation of the carousel 20, the lower end of the rod 54 springs down into a corresponding well or depression 58 in the top surface of the ramp 56, as shown by the dotted lines of FIG. 9. When the rod 54 extends into the well or depression 58, the carousel 20 is maintained in a selected angular position of rotation. When further rotation of the carousel 20 is desired, the operator can energize the solenoid, whereby the rod 54 retracts against the bias of the spring in the solenoid so as to lift upwardly out of the well 58 and above the ramp 56. In such condition, the carousel 20 is permitted to rotate further, and the solenoid is de-energized, such that the rod 54 depends and extends downwardly under the bias of the spring in the solenoid.

The mass data storage library of the present invention may be provided with a pair of ramps 56 disposed 180 degrees apart beneath the carousel 20 such that one ramp is positioned so that when the lower end of the rod 54 extends into the well 58 therein, the shelves 22 are facing outwardly, toward the door 12, and the other ramp 56 is positioned so that when the rod 54 extends into the well 58 therein, the carousel 20 is positioned so that the shelves 22 are properly positioned for presentation to and access by the robot.

Figure 10:
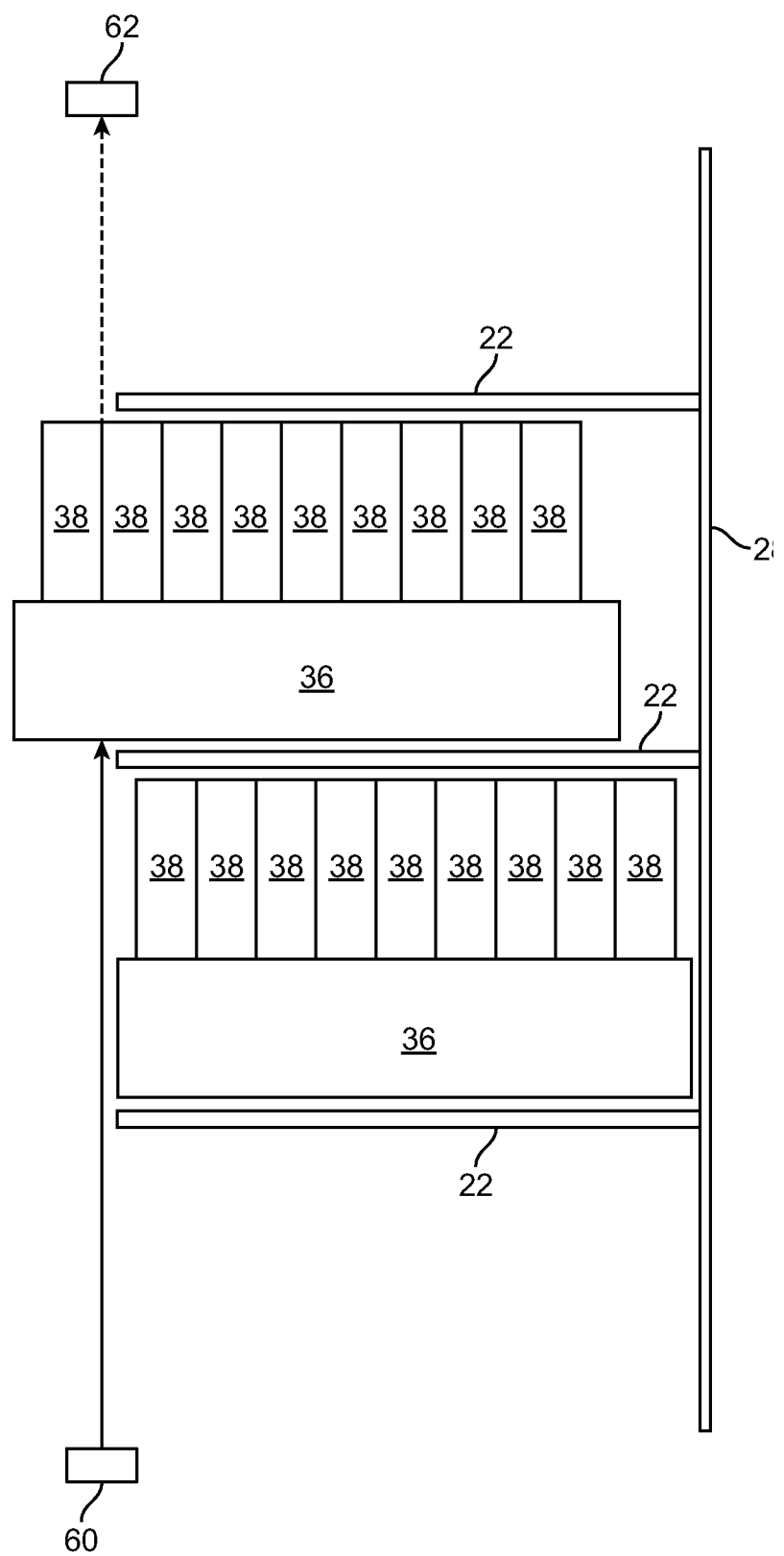
FIG. 10 is a schematic illustration of a light system that may be used to detect whether a magazine has been improperly positioned along a shelf in the rack in a preferred embodiment of the present invention.

The invention further contemplates a system for determining whether a magazine 36 is insufficiently inserted along a shelf 22. In a preferred embodiment as illustrated in FIG. 10, a light source 60 such as an LED is mounted near the bottom of the housing, and a light sensor 60 is mounted near the top of the housing and is adapted to receive and detect light from the light source 60. The light source 60 and the light sensor 62 are positioned so that light emitted from the light source 60 on a direct path to the light sensor 62 passes along the outer edges of the shelves 22, only a short distance therefrom, such as a distance in the range of about five to fifteen millimeters, when the shelves 22 are oriented toward the door 12. The light beam will not be interrupted by a magazine 36 that is sufficiently inserted longitudinally along a shelf 22, in which event the light sensor 62 will notify a microprocessor of that status and the microprocessor may relay a message that all of the magazines 36 are properly inserted. The message may be sent to an audio or visual display available to the operator. The microprocessor may then permit the carousel to rotate to a position where the magazines 36 are presented to and accessible by a robot. In contrast, if the light sensor 62 does not sense light from the light source 60, due to the light being blocked by an insufficiently inserted magazine 36, then the light sensor 62 will send a different message to the microprocessor, and the microprocessor will send a message to an audio or visual display available to the operator, which in effect informs or alarms the operator that there is a magazine 36 that is not been sufficiently inserted. If the light sensor 62 does not detect the light being emitted from the light source 60, then the microprocessor may also prohibit the motor from rotating the carousel 20 more than a relatively small angular range, so that the carousel 20 will not rotate to a position where the insufficiently inserted magazine 36 may cause or incur damage.

In a preferred embodiment, the microprocessor will relay a magazine status message to a button 52 located on the exterior of the housing 10, to the right of the door 12, as best shown in FIG. 2. A flashing light in the button 52 may alert or alarm the operator that a magazine 36 is not sufficiently inserted. The operator may then depress the button 52, which communicates with the microprocessor to command the motor of the carousel 20 to rotate the carousel in one direction, and then the other direction, as previously described.

It should be appreciated that the present invention may be employed where a shelf 22 accommodates only a single magazine 36, instead of two magazines 36. The invention may be employed with other types of rails or guides, or with no rails or guides. The invention may also employ different types of detent mechanisms, or no detent mechanisms. The invention might also utilize bumpers against which a magazine 36 abuttingly contacts when properly positioned along a shelf.

While exemplary embodiments have been presented in the foregoing description of the invention, it should be appreciated that a vast number of variations within the scope of the invention may exist. The foregoing examples are not intended to limit the nature or the scope of the invention in any way. Rather, the foregoing detail description provides those skilled in the art with a foundation for implementing other exemplary embodiments of the invention.

I claim:

1. A system for properly positioning a media magazine insufficiently received into a compartment in a data storage library, the system comprising:
    a rotatable carousel;
    a magazine compartment disposed in the carousel and concurrently rotatable therewith, the compartment adapted to receive a media magazine capable of holding a plurality of media therein; and
    means for urging a media magazine that is insufficiently received in the compartment toward a position where the media magazine becomes properly received therein.

2. A system according to claim 1 further comprising means for determining whether a media magazine is insufficiently received into the compartment.

3. A system according to claim 1 wherein the urging means includes a biasing element adapted to contact an end of the media magazine when the carousel is rotated.

4. A system according to claim 2 wherein the determining means includes a light source adapted to project a beam of light adjacent to the compartment and a light sensor adapted to sense the projected light beam such that, when said the media magazine is insufficiently received in the compartment, the media magazine blocks the projected light beam and thereby causes the light sensor not to sense the projected light beam.

5. A system according to claim 3 wherein said biasing element includes a projecting knob, a longitudinal track, and a spring, wherein the knob is adapted to ride along the track, the knob is maintained under the bias of the spring toward a first longitudinal end of the track, and the knob is adapted to move against the bias of the spring toward a second longitudinal end of the track upon contacting the end of the insufficiently received media magazine when the carousel is rotated.

6. A system according to claim 5 wherein the knob is adapted to loosely ride along the track such that the knob may wobble within a limited angular range of no more than about twenty degrees upon contacting the end of the insufficiently received media magazine when the carousel is rotated so as to substantially eliminate any possibility that the knob will frictionally bind against the walls of the track.

7. A system according to claim 5 wherein the knob is selected from the group consisting of a cap possessing a convex outer surface adapted to contact the end of the insufficiently received media magazine when the carousel is rotated and a rotatable wheel adapted to contact the end of the insufficiently received media magazine when the carousel is rotated.

8. A system according to claim 1 wherein the urging means is adapted to push against the insufficiently received media magazine when the carousel is rotated within the range of about seven to twenty-five degrees.

9. A system according to claim 8 wherein the urging means is adapted to push against the insufficiently received media magazine when the carousel is rotated within the range of about ten to fifteen degrees.

10. A system according to claim 1 wherein the compartment includes at least one side wall and wherein the side wall possesses an indented periphery adapted to permit the urging means to avoid contacting the at least one side wall when the carousel is rotated.

11. A system according to claim 4 further including means responsive to the light sensor for creating an alarm signal indicating that the media magazine is insufficiently received in the compartment.

12. A system according to claim 1 further comprising a library housing possessing a door and wherein the carousel and the compartment are disposed adjacent to the door and wherein the urging means is disposed substantially on the door.

13. A system according to claim 1 further comprising means for stopping the carousel at a selected position of rotation.

14. A system according to claim 13 wherein the stop means includes retractable pin mounted to and adapted for concurrent rotation with the carousel and a stationary, beveled ramp possessing a depression for accommodating a distal end of the pin and positioned such that when the carousel is rotated the pin may contact a beveled portion of the ramp, travel up the beveled portion, and extend into the depression whereby further rotation of the carousel is inhibited unless the pin is retracted.

15. A data storage library comprising:
    a housing having a door;
    a rotatable carousel disposed in the housing and adjacent to the door;
    a magazine rack comprising a plurality of vertically spaced shelves, each shelf adapted to receive at least one magazine slideably inserted therein along a longitudinal direction and to selectively maintain the at least one magazine slideably inserted therein at a predetermined longitudinal position, each magazine being capable of holding a plurality of media therein, the rack carried on the carousel for concurrent rotation therewith; and means for urging one of the magazines that is not maintained at the predetermined longitudinal position such that the magazine moves to the predetermined longitudinal position.

16. A data storage library according to claim 15 further comprising means for determining whether one of the magazines is maintained at the predetermined longitudinal position.

17. A system according to claim 15 wherein the urging means is adapted to push against one of the magazines when the carousel is rotated within the range of about ten to fifteen degrees.

18. A system according to claim 15 wherein the rack includes at least one side wall and wherein the side wall possesses an indented periphery adapted to permit the urging means to avoid contacting the at least one side wall when the carousel is rotated.

19. A system according to claim 15 wherein the urging means is disposed substantially on the door.

20. A data storage library according to claim 15 wherein each shelf is adapted to receive at least two of the magazines in a substantially horizontally side-by-side relationship.

21. A data storage library comprising:

a compartment adapted to receive a removable media magazine slideably therein along a longitudinal direction to a predetermined longitudinal position therein; and a resilient member adapted to contact the removable media magazine in the compartment when the removable media magazine has not been slid sufficiently along to the predetermined longitudinal position, such that the contact causes the removable media magazine to slide farther along to the predetermined longitudinal position, the resilient member adapted to contact the removable media magazine substantially only when the compartment has been moved in a lateral direction relative to the resilient member.

* * * * *